United States Patent Office 3,134,742
Patented May 26, 1964

3,134,742
FLAME RETARDANT POLYURETHANE FOAMS
Marco Wismer and Louis R. Le Bras, Richland Township, Gibsonia, and John R. Peffer, Penn Hills, Pa., assignors to Pittsburgh Plate Glass Company, Allegheny County, Pa., a corporation of Pennsylvania
No Drawing. Filed May 17, 1960, Ser. No. 29,592
13 Claims. (Cl. 260—2.5)

This invention relates to polyurethane resins and it has particular relation to polyurethane resin in foam state and having improved resistance to flame.

It has heretofore been disclosed to form foamed polyurethane resins by reacting a polyhydroxy compound with an organic compound containing a plurality of isocyanate radicals. When the components are brought together, the hydroxyl groups and the isocyanate groups react to provide polyurethane linkages which cross-link the molecules to provide a solid resin structure. In the formation of such resins, a gas-producing agent is also often included and by its action the resin, before it becomes solid, is converted into a cellular or foam-like state, which is permanently retained when the mixture has reacted to a sufficiently advanced state to provide a solid material. By proper techniques, it is thus possible to provide cellular or foam structures of very low density and fine, uniform cell structure. These materials have many applications, for example, as cushioning materials, as insulating materials against the transmission of sound and heat, and for various other purposes.

One serious objection to these materials, as they have heretofore been prepared, resides in the fact that the resistance thereof to flame is relatively poor. Ofter a slab or other body of the foamed material, when once ignited, will continue to burn without further application of flame until it is completely consumed. It has been proposed to reduce the flammability of the polyurethane resin foams by the addition thereto of certain fire retardant agencies, of which the best previously applied has been finely pulverulent antimony trioxide. This material will improve the resistance to flame of the polyurethane foam, but such large amounts (about 10 percent or more) are required that it presents problems in the foam production, for example, stratification or separation thereof may occur. Moreover, it is seriously objectionable because it impairs the strength of the foam and also, it produces a foam which has a strong afterglow characteristic even after the ignited foam is extinguished.

In accordance with the provisions of the present invention, it has been found that the flame resistance of polyurethane resin foams can be greatly improved without correspondingly impairing the compressive strength, resistance to abrasion, flammability characteristics (no afterglow) and other valuable properties of the foam. This result is obtained by the incorporation into the foamable mixture of a system of synergistically coacting flame retarding agents. The first of these agents (A) comprises a relatively small amount of a material which usually is a finely pulverulent solid which is insoluble in and incompatible with the foamable mixture, but may also be a liquid material, said agent (A) should contain a relatively high proportion of nitrogen and phosphorus.

The second of the synergistically coacting materials (B) comprises a liquid phosphorus-containing polyol, compatible with the foamable mixture and inherently possessing some degree of flame retardancy and which may contain other functional groups, such as —SH, —NH, —NH₂, which are adapted to react with isocyanate groups in the foamable mixture in order chemically to combine the phosphorus-containing compound and the resin.

Even though neither type (A or B) of flame retardant agent will, by itself, give good flame resistance to a foam, at least without use thereof in such excessive amounts as to be impracticable, the combination of reasonable amounts of the two does greatly enhance the flame resistance of a foam containing them. This is true even though the amounts of the two types (A and B) are so small that they could not a priori be expected to be effective. This demonstrates that there is a definite synergistic effect between the two materials. At the same time, all or most of the other valuable properties, such as mechanical strength, low density and high percentage of closed cells, are retained.

The first of the materials, for example, the solid, pulverulent compound (A) containing nitrogen groups and phosphorus atoms, which may be incorporated into the polyurethane resins synergistically to improve fire resistance, is to be regarded as being a phosphorus-containing polyamide in which a phosphorus atom is usually directly linked to nitrogen, replacing an active hydrogen atom of amino or amido nitrogen. The materials are insoluble in water and in most organic solvents. They all contain the group

which usually contains oxygen to provide the structure:

They are best obtained by reacting ammonia or a derivative thereof, which is rich in nitrogen and contains active hydrogen atoms attached to the amino or amido nitrogen groups with acids containing phosphorus, such as phosphoryl chloride or orthophosphoric acid. Usually, the molecules of the amino or amido compound will contain at least about 18 percent of nitrogen, the rest of the molecules being atoms of hydrogen or carbon and hydrogen, and in some instances, atoms of oxygen or sulfur.

Appropriate compounds containing atoms of nitrogen with active hydrogen atoms attached thereto and which can be reacted with phosphorus-containing acids may be selected from a group comprising:

Ammonia
Ammonium carbonate
Ammonium carbamate
Urea
Urea-formaldehyde condensate
Melamine
Melamine-formaldehyde condensate
Guanadine carbonate-formaldehyde condensate
Cyanamide
Dicyanodiamide
Ammeline
Cyanuric acid
Dimethylol urea
Guanadine
Biguanide
Biuret
Ethylene imine
Uric acid
Diformal hydrazine
Methylamine
Dimethylamine
Ethylamine
Propylamine
Hydrazine
Methyl hydrazine
Ethyl hydrazine The reaction of the foregoing compounds directly with phosphorus-containing compounds, such as phosphorus oxychloride, phosphorus pentoxide, phosphorus pentachloride or phosphorus trichloride, is contemplated, but the foregoing compounds may also be reacted with aldehydes, such as formaldehyde, and the resulting product reacted with the phosphorus-containing compound. While the derivatives are normally water-insoluble solids which, in pulverulent state, can be incorporated along with a phosphorus-containing polyol into a foamable mixture of a polyol and a diisocyanate, it is also possible to obtain liquid polyamides which function in substantially the same manner. An example of such a liquid phosphorus-containing polyamide is hexamethyl phosphoramide of the formula:

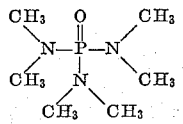

Phosphorus compounds which are adapted to react as acids with the active hydrogen atoms in the nitrogen groups of the foregoing compounds or their aldehyde derivatives, may be selected from the following group.

Phosphorus-containing acids such as:
    Phosphoric acid
    Phosphorus acid ($H_3PO_3$)
    Metaphosphoric acid
    Pyrophosphoric acid
    Hypophosphoric acid
    Polyphosphoric acid
Oxides of phosphorus such as:
    $P_2O_5$
    $P_2O_4$
    $P_2O_3$
Phosphorus oxyhalides, e.g.: Phosphorus oxychloride
Halides of phosphorus such as:
    $PCl_3$
    $PCl_5$
    $PBr_3$
    $PBr_5$
Miscellaneous compounds, e.g.:

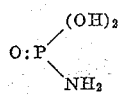

and others.

In combining the nitrogen-containing compound and the phosphorus-containing compound to provide a phosphorus-containing amide suitable for use in enhancing the flame resistance of polyurethane resin foams, the two compounds may react in equivalent amounts based upon the available nitrogen groups containing atoms of reactive hydrogen on the one hand, and the functioning groups attached to phosphorus on the other, even though an excess of one or the other of the two components may be present in the mixture. The excess of the component or of any unreacted components may be removed at the end of the reaction by washing or other appropriate techniques. In some instances where the excess component is not so great as to render the material unduly acid, its presence may be tolerated.

In conducting the reaction, it will be observed that the temperature will often tend to rise, in which instance the application of external heat is not required, except perhaps to initiate the reaction. The application of such temperatures as may be desired to initiate or to speed up the reaction is not precluded. In fact, in some instances, temperatures as high as 400° C. or even higher may be required to form a suitable product.

It is also often desirable at the conclusion of the reaction between the nitrogen compound and the phosphorus compound, to bake the product to convert the same into a friable, water-insoluble state and then to grind the compound to a fine powder.

The techniques disclosed in United States Patent No. 2,596,935 to Malowan et al. may be employed to provide such pulverulent materials.

The following constitute examples illustrating the reaction of ammonia or derivatives thereof and a phosphorus compound, said derivatives being solid materials adapted for incorporation along with a phosphorus-containing compound into foamable mixtures of polyols and an organic polyisocyanate.

EXAMPLE A

In accordance with the provisions of this example, ammonia (anhydrous) was dissolved in a nonreactive diluent, such as kerosene, and was then reacted with phosphorus oxychloride ($POCl_3$). The method of preparing the compound was the same as or similar to that disclosed in the foregoing United States Patent No. 2,596,935.
The reaction mixture comprised:

| | Parts by weight |
|---|---|
| Phosphorus oxychloride | 240 |
| Ammonia ($NH_3$) | 113 |
| Kerosene (solvent) | 1770 |

The molar ratio of ammonia to phosphorus oxychloride in the reaction mixture was 4.25 to 1.

In conducting the reaction, the phosphorus oxychloride and the kerosene were charged into a reaction vessel equipped with a stirrer, a thermometer, an inlet for ammonia gas, and a reflux condenser. The mixture was stirred and heated to a temperature of 72° C. and the heat was removed and the addition of gaseous $NH_3$ was initiated. A white precipitate began to form immediately and the temperature rose over a period of 10 minutes to 78° C. The addition of gaseous ammonia was continued until a total weight increase of 114 parts by weight was attained as against a theoretical increase of 113 parts by weight.

Stirring was continued and the temperature was increased to 200° C. for a period of about 6 hours. Heating was then discontinued and the reaction solution was filtered, and the precipitate thus obtained was washed several times with a mixture of aliphatic naphtha and subsequently was further washed repeatedly with water to extract ammonium chloride formed in the reaction. Washing was continued until substantially all of the latter was removed. Subsequently, the precipitate was still further washed with toluene to remove residual kerosene. Subsequently, it was washed further with aliphatic hydrocarbon solvent and it was filtered off and was dried in a vacuum oven at a temperature of 60° C. to 100° C. The resultant product was a water-insoluble, polymeric phosphoryl amide of the starting ammonia and the phosphorus compound. This product, upon analysis, was found to contain:

| | Percent |
|---|---|
| Phosphorus | 30.0 |
| Nitrogen | 22.3 | and the product was used along with a phosphorus-containing liquid material in order to synergize the flame resistance of a foamed polyurethane resin, as hereinafter described.

In forming the phosphorus-containing polyamide, the molar ratio of the ammonia to the phosphorus oxychloride may be varied in a range of about 2 to 6 moles of the former to 1 mole of the latter.

EXAMPLE B

In accordance with this example, melamine was reacted with phosphorus pentoxide in accordance with the techniques disclosed in United States Patent No. 2,544,706, to provide a solid, water-insoluble product which was ground and then used to enhance the flame retardant properties of a foamed polyurethane resin. The reaction mixture comprised:

| | Parts by weight |
|---|---|
| Melamine | 126.1 |
| Phosphorus pentoxide | 47.3 |

The molar ratio of melamine to phosphorus pentoxide was 3 to 1. The melamine could be used in a ratio of about 2 to 6 moles. In the reaction, the foregoing components were thoroughly mixed together and the mixture was then placed in crucibles, which in turn were placed in a muffle-type furnace and heated to a temperature of 400° C. The temperature was increased in the oven to 410° C. and was maintained in a range of 400° C. to 410° C. for approximately 4 hours. The product was a solid, water-insoluble resin which was ground in a pebble mill. The product was water-insoluble and had a phosphorus content of 14.12 as against a theoretical value of 13.5. A repetition of this example, wherein the mixture was heated in an oven for approximately 3¼ hours at a temperature in a range of 150° C. to 280° C., resulted in a product having a phosphorus content of 13.9 as against the foregoing theoretical value of 13.5. This material was also ground to a powder and was used in combination with a phosphorus-containing liquid compound in the enhancement of the flame resistance of a polyurethane foam in the manner hereinafter described.

EXAMPLE C

In accordance with this example, a solid, water-insoluble nitrogen-phosphorus compound was prepared from urea and phosphorus pentoxide, the reaction mixture comprising:

| | Parts by weight |
|---|---|
| Urea | 130 |
| Phosphorus pentoxide | 68.3 |

The molecular ratio of the ingredients in the foregoing mixture was 4.5 moles of urea to 1.0 mole of phosphorus pentoxide. The foregoing mixture was heated in crucibles in an oven at a temperature of 129° C. The mixture was heated for 4 hours, during which time it tended to foam in the crucibles. At the conclusion of the period of heating, the product was removed and ground to pass through a 100-mesh sieve. The phosphorus content of this material was 16.7 percent as against a theoretical value of 16.0 percent. The material could be used as a synergist with a phosphorus-containing polyol to increase the flame resistance of a foamed polyurethane resin as hereinafter described.

EXAMPLE D

The polymeric phosphorus-containing resin of this example was prepared by reacting guanadine carbonate in admixture with melamine and formaldehyde to form an amino resin which was then reacted with phosphoric acid to provide a phosphorus-polyamido (P—N—) resin that could be ground and used with a phosphorus-containing polyol in accordance with the provisions of the present invention as a synergist in the preparation of fire resistant polyurethane resins.

The techniques of preparing this type of phosphorus-containing resin are disclosed in United States Patent No. 2,628,946. The same techniques or similar techniques were followed in this example. The initial reaction mixture as herein disclosed comprised:

| | Moles |
|---|---|
| Guanadine carbonate | 1 |
| Melamine | 1 |
| Formaldehyde in the form of a 37 percent aqueous solution | 2 |

The foregoing mixture was allowed to react for 2 hours at room temperature.

At the end of the initial reaction period, 32 percent of the calculated amount of phosphoric acid was added slowly to the reaction mixture and the latter was stirred for 30 minutes. At the end of the period of stirring, the remainder of the calculated phosphoric acid was added with further stirring. During the course of the addition of the phosphoric aid, a substantial amount of carbon dioxide was liberated. The phosphoric acid-resin mixture was allowed to cool at room temperature to a solid state and was then placed in an oven at 240° F. for approximately 30 minutes. The resultant dried resin was ground to a fine powder. A slight variation of this technique comprised initially drying the resin in an oven at 240° F. until a soft, but solid mass was formed, and then breaking the mass into pieces about the size of a pea and returning the product so broken to the oven until it was very hard and brittle. The fine powder was subsequently washed with water until it was free from excess acid.

If desired, the washing operation may be substantially speeded up without appreciable impairment of the pulverulent product by washing the powder with sodium carbonate solution until the powder is neutral. Subsequently, the neutral product is washed several times with water to remove any phosphate salt that has been formed. Finally, the resin is washed with acetone and dried.

The foregoing pulverized resin in conjunction with a phosphorus-containing polyol is well adapted for incorporat on with the foamable mixtures of polyols and organic diisocyanates in order synergistically to improve the flame retardant properties of the foamed polyurethane resins therefrom.

Melamine may be replaced by urea in the foregoing preparation. Guanadine may be used in place of guanadine carbonate. Urea alone or melamine alone may be reacted with formaldehyde and then with phosphorus pentoxide or other appropriate form of phosphorus to provide a P—N compound that can be used in the practice of the invention.

A liquid phosphorus-containing polyamide which may also be used with a phosphorus-containing polyol in order to synergize flame retardancy in foams, is illustrated by hexamethyl phosphoramide, already referred to.

Regardless of the method by which the nitrogen and phosphorus-containing materials described above are prepared, or the reactants utilized in their preparation, it has been found necessary that the products contain a minimum of about 10 percent of nitrogen and 10 percent of phosphorus in order that they will function satisfactorily in combination with phosphorus-containing polyols as flame proofing agents for polyurethane resins. Preferably, the product should contain at least about 15 percent or more of nitrogen and about 15 percent or more of phosphorus in order that optimum flame proofing characteristics will be obtained.

The phosphorus-containing polyol useful in forming the improved flame retardant polyurethane foams usually is a liquid and is soluble in, or compatible with the polyol-isocyanate components of the foamable mixture. These materials may be formed by reacting phosphoric acid, or phosphorus oxychloride, or other compound reacting to provide the same ultimate ester products with a polyol. In some instances, the esters include one or more amino groups which are attached to the phosphorus-containing radical through a methyl, ethyl, propyl, or other appropriate hydrocarbon group. Many of these compounds may be represented by the formula:

Some of the groups R may be alkoxy as:

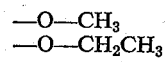

phenoxy as:

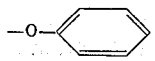

or hydroxy alkyl as:

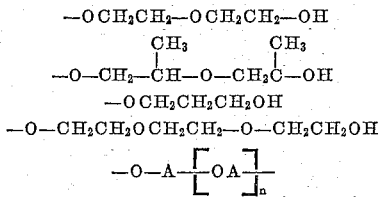

$$-O-A-\left[-OA-\right]_n$$

wherein A is an aliphatic hydrocarbon group and $n$ is a whole number from 0 to 50

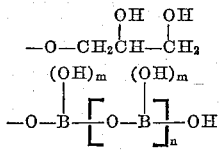

B being an aliphatic group containing up to about 6 carbon atoms and $m$ being a whole number from 1 to 6 and $n$ being a number from 0 to 10

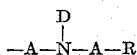

R being H or OH, groups A being like or unlike and being alkylene containing up to about 6 carbon atoms, and D being selected from the group consisting of H and aliphatic hydrocarbon groups containing up to about 6 carbon atoms; examples of said group R are:

—$CH_3$
—$CH_2CH_3$
—$CH_2OH$
—$CH_2CH_2OH$ and others.

Groups R may also be amino with alcoholic hydroxyl groups. Examples of such groups R may be represented by:

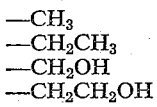

G being alkylene containing from 1 to about 6 carbon atoms and $R_2$ being alkyl or hydroxyl substituted alkyl containing 1 to about 6 carbon atoms, and $R_3$ being like or unlike and being —H, —OH, —$CH_3$, —$CH_2CH_3$, etc.

The hydroxyl radicals in the foregoing phosphorus-containing polyols can react with organic diisocyanates to give urethane linkages engrafted upon or cross-linking the radicals from the phosphorus-containing polyol upon the regular polyol component of a polyurethane resin.

In the formula

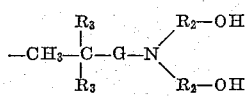

the group Z is selected from the class consisting of hydrogen and groups of the same family as the groups R and a group having the structure:

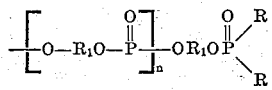

wherein $R_1$ is an alkylene group or a plurality of alkylene groups interconnected by ether linkages, or hydroxyalkylene, and wherein groups R have the significance previously given, and the sum of the hydroxyl radicals in groups R and $R_1$ of the total molecule is a number from 2 to about 10, and $n$ is a number from 0 to about 6. Those phosphorus-containing polyols hereinafter more fully illustrated and being obtainable by reacting phosphoric acid first with a polyol, such as ethylene glycol or propylene glycol or diethylene glycol or triethylene glycol, and then with an alkylene oxide, such as ethylene oxide or propylene oxide, are representative of this family.

In the groups R and Z in the formula:

the sum of the —OH radicals will usually equal at least 2 and may be as high as about 10.

Examples of general formulae of the phosphorus polyols comprise:

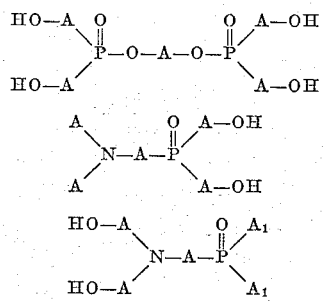

wherein groups A are like or unlike, hydrocarbon groups containing up to about 6 carbon atoms, or are chains comprising 2 or more of such groups joined by oxygen linkages. Groups $A_1$ may also contain 1 to 3 hydroxyl radicals along the hydrocarbon chain.

The following examples are illustrative of the preparation of phosphorus-containing polyols which may be used in combination with phosphorus-nitrogen solid compounds as additive in the preparation of flame retardant polyurethane foams. In the preparation of these phosphorus-containing polyols, it is convenient to react a polyol, such as glycerol or a glycol, with phosphoric acid and phosphorus pentoxide in the presence of a suitable diluent in order to provide a partial ester of phosphoric acid.

Low acid value esters of phosphoric acid and a polyol are usually difficult to prepare. Accordingly, it is preferred to react a phosphoric acid, e.g., phosphoric acid or polyphosphoric acid, with about a ⅓ equivalent amount of a suitable polyol to provide an acid ester and then to react the latter with an alkylene oxide. Since commercial phosphoric acid often contains water, it is convenient to include in the reaction mixture enough $P_2O_5$ to remove the same. Water may also be removed by other means, as by azeotropic distillation.

EXAMPLE E

In this example, the polyol component was glycerol. The initial reactants comprised:

| | |
|---|---|
| Phosphoric acid (85 percent) | 284 grams (2.46 moles). |
| Phosphorus pentoxide | 113.6 grams (0.80 mole). |
| Glycerol | 93.9 grams (1.015 moles). |
| Xylene (nonreactive solvent) | 310 milliliters. |

In conducting the reaction, the xylene and the phosphorus pentoxide were charged into a suitable flask equipped with a stirrer, an azeotropic adapter, a water condenser, a thermometer, a dropping funnel, and such like conventional appurtenances. The phosphoric acid was added dropwise, the flask being cooled during the addition to a temperature in a range of about 60° C. to 74° C. At the conclusion of the addition of the phosphoric acid, the addition of glycerol was started and during such addition, the mixture was agitated. Heat was then applied and the mixture was brought to reflux temperature and refluxing was continued to remove 49.5 grams of water, or until water ceased to evolve.

At the conclusion of the foregoing stage of the reaction, the mixture was heated to a temperature of 90° C. to 100° C. and held under vacuum for 1 hour in order to distill off the solvent. A yield of 90 percent of a partial ester of glycerol and polyester was obtained. The product had an acid value of 784.

This product was then reacted with propylene oxide to provide a phosphorus-containing polyol of low acid value in the following manner:

| | |
|---|---|
| Foregoing reaction product of glycerol and $H_3PO_4$ grams__ | 388 |
| Propylene oxide do____ | 944 |
| Dimethyl ether of ethylene glycol (diluent) milliliters__ | 200 |

In conducting the reaction, the reaction product of phosphoric acid and the glycerol was charged into a flask equipped with a stirrer, condenser, dropping funnel, thermometer, and such like appurtenances. The mixture was stirred and the propylene oxide was added dropwise, the temperature being maintained in a range of 45° C. to about 50° C. for a total of about 7½ hours. Subsequently, the solvent was stripped under vacuum while bubbling in inert gas. The mixture was heated to a temperature of 80° C. to 90° C. and held for 1 hour. A yield of 95.4 percent was obtained. The product was of the following characteristics:

| | |
|---|---|
| OH value | 290.5 |
| Percent solids | 76.2 |
| Acid value | 31.66 |
| Viscosity | Z+ |
| Percent phosphorus | 8.9 |

This phosphorous-containing polyol could successfully be employed in the preparation of fire retardant foams in the manner herein disclosed.

Essentially the techniques of Example E were pursued in the preparation of a series of phosphorus-containing polyols (Example F–J). In conducting the reaction, phosporic acid (usually anhydrous) was reacted in a first stage with a polyol to provide a partial, or acid ester. In a second stage, this acid ester was reacted with ethylene oxide or propylene oxide to provide a phosphorus-containing polyol having

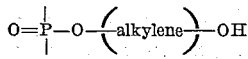

groups (alkylene being ethylene or propylene).

The essential data for the preparation of the acid, or partial esters of the entire series are tabulated as follows:

EXAMPLE K

Still another type of phosporus-containing polyol may be obtained by the reaction of dialkyl phosphite, such as diethyl phosphite of the structure $(C_2H_5O)_2POH$, with an alkanolamine, such as diethanolamine, and an aldehyde or a ketone, such as acetaldehyde or acetone. A general structure of this type of compound may be represented by the formula:

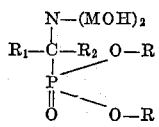

wherein M is alkylene, e.g., $-CH_2$, $-CH_2CH_2-$, $-CH_2CH_2CH_2-$, and

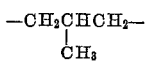

and group R, $R_1$ and $R_2$ are alkyl, e.g., $-CH_3$, $-CH_2CH_3$, $-CH_2CH_2CH_3$, or hydroxyalkyl as in $-CH_2OH$, $-CH_2CH_2OH$, $-CH_2CH_2CH_2OH$

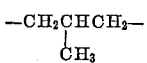

and $R_1$ and $R_2$ may also be $-H$ and others. The following is illustrative of the preparation of a material of this class.

In the preparation, the total of the reaction charge comprised:

| | Moles |
|---|---|
| Diethyl phosphite | 0.2 |
| Diethanolamine | 0.2 |
| Acetaldehyde | 0.2 |

In conducting the reaction, the foregoing reactants were introduced into a flask at room temperature, whereby a violent reaction occurred, the temperature rising exothermally to 105° C. The reaction mixture was subjected to an absolute pressure of 100 millimeters of mercury overnight while being subjected to slight heating. A

Table I
PREPARATION OF ACID ESTER

| Example | Grams $H_3PO_4$ | Grams $P_2O_5$ | Polyol kind | Grams | Nonreactive solvent | Milliliters | Acid ester, acid value |
|---|---|---|---|---|---|---|---|
| E | 284 | 113.6 | Glycerol | 93.9 | xylene | 310 | 784 |
| F | 284 | 113.6 | Propylene glycol | 152.2 | ___do___ | 400 | 684 |
| G | 142 | 56.8 | Diethylene glycol | 108 | ___do___ | 75 | 826.7 |
| H | [1] 200 | | 1,4-butanediol | 90.1 | ___do___ | 150 | 798 |
| I | 426 | 170 | Ethylene glycol | 199 | ___do___ | 150 | 828 |
| J | [2] 230 | | ___do___ | 62.1 | ___do___ | 200 | 806 |

[1] Anhydrous.  [2] 85 percent.

The essential data for the preparation of the corresponding polyols from the acid esters are tabulated as follows:

Table Ia
PREPARATION OF PHOSPHORUS-CONTAINING POLYOL FROM ACID ESTER

| Example | Acid ester (grams) | Acid value | Alkylene oxide | | | Nonreactive diluent, milliliters | OH | Acid value | Percent yield | P |
|---|---|---|---|---|---|---|---|---|---|---|
| | | | Kind | Grams | Moles | | | | | |
| E | 388 | 784 | Propylene | 944 | 16.27 | [1] 200 | 290 | 31.66 | 95.4 | 8.9 |
| F | 450 | 684 | ___do___ | 810 | 13.95 | [1] 200 | 364.2 | | 94.7 | 10.42 |
| G | 133 | 826.7 | Ethylene | 228 | 5.17 | [1] 86.8 | 325.4 | 11.1 | | 8.56 |
| H | 169 | 798 | Propylene | 361 | 6.23 | [1] 100 | 308 | 27.4 | 93 | 9.50 |
| I | 160 | 828 | ___do___ | 384 | 6.6 | [1] 100 | 325.3 | 17.2 | 90.5 | 10.34 |
| J | 149 | 806 | ___do___ | 430 | 7.36 | [2] 200 | 361.5 | | 75 | 9.75 |

[1] Second diluent in each of the examples was dimethyl ether of ethylene glycol.
[2] Dioxane.

liquid product in an amount of 455 grams was obtained and samples were subjected to infrared analysis and to analysis for phosphorus, nitrogen and carbon. The product was of a refractive index of 1.4604 and a hydroxyl value of 293.5. The elemental analyses were as follows:

Carbon _____ 42.45
Hydrogen _____ 8.31
Phosphorus _____ 12.34
Nitrogen _____ 5.69
Oxygen _____ 31.00

This material was considered to be largely of the structure:

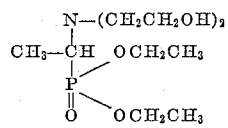

The material is suitable for use along with the various phosphorus-nitrogen solid compounds herein disclosed synergistically to improve the flame resistance of polyurethane resins. The material had an analysis which was close to that of the commercial phosphorus and nitrogen-containing polyol sold as Victor additive #6. Still another phosphorus polyol additive is sold as Vircol 82, which is a phosphate diol. The anaylses of these two polyols are:

|  | Victor additive #6 | Vircol 82 |
| --- | --- | --- |
| Carbon | 41.95 | 47.58 |
| Hydrogen | 8.88 | 9.06 |
| Phosphorus | 12.61 | 11.35 |
| Oxygen | 31.01 | 32.01 |
| Nitrogen | 5.70 | 0 |
| Hydroxyl value | 420-435 | 200-220 |
| Acid value | 0-20 | <1 |

In order to obtain a polyurethane foam, there may be employed various polyol materials which are of more conventional type, in that they do not contain phosphorus and are not esters thereof, but are reactive with organic diisocyanates, such as toluene diisocyanate. Examples of such polyols comprise castor oil, mixtures of polyethylene glycol and castor oil, the latter being a glyceride of ricinoleic acid in which the fatty acid radicals contain hydroxyl groups. Polyesters of polyols, such as diethylene glycol or dipropylene glycol, are also useful, as are the polycarbonates.

Other polyesters which may be mixed with a phosphorus-containing polyol, a solid nitrogen-phosphorus compound and an organic diisocyanate to form flame retardant polyurethane resin foams, are illustrated by the polyesters of acids, such as adipic acid or phthalic anhydride, and polyols, such as diethylene glycol, propylene glycol, trimethylolethane, and others, as well as mixtures of the same. Still another appropriate polyester comprises:

| | Moles |
| --- | --- |
| Phthalic anhydride | 0.5 |
| Adipic acid | 2.0 |
| Trimethylolethane | 3.1 |
| Ethylene glycol | 1.1 |

This mixture preferably is cooked in well-known manner to a hydroxyl number of about 463 and to an acid value of about 1.7.

Still another class of materials comprises the polyether polyols derived by reacting an alcohol containing many hydroxyl radicals, such as sucrose or sorbitol, with an alkylene oxide. The formula of the sucrose polyether polyol may be represented as follows:

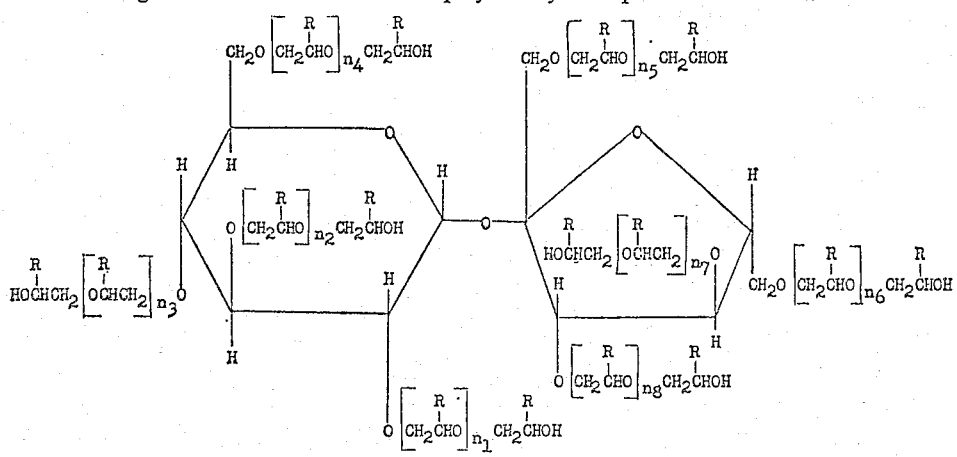

If desired, sucrose may be replaced in the preparation of the polyol by other polyols, such as sorbitol and the like polyols containing a relatively high number of hydroxyl groups. In the formula, H may be hydrogen or —$CH_3$. The symbols $n_1$, $n_2$, $n_3$, $n_4$, $n_5$, $n_6$, $n_7$ and $n_8$ are numbers from 0 to 8. The materials result from reacting about 8 to about 30 moles of an alkylene oxide, represented by ethylene oxide or propylene oxide, with sucrose. The reaction is conducted in the presence of water and in the presence of alkali, e.g., sodium hydroxide. The reaction is also conducted in an appropriate chamber at a positive pressure below about 200 p.s.i. and the alkylene oxide is bubbled into the mixture. Bubbling is continued until the selected amount of alkylene oxide within the foregoing range has reacted. The reaction temperature is about 70° F. to 270° F. The products are liquids and have molecular weights of about 700 to 1800 and hydroxyl numbers of about 300 to about 700. In many instances, minor amounts, e.g., 1 to 15 percent by weight based upon the total polyol of a low molecular weight polyhydric, such as trimethylolethane, pentaerythritol, or the like, may be added to reduce viscosity of the mixtures.

The polyols previously described may be mixed in appropriate amounts with organic diisocyanates to form polyurethane resins. The following are illustrative of organic diisocyanates which may be used for this purpose:

Toluene diisocyanate
Diphenyl diisocyanate
Triphenyl diisocyanate
Chlorophenyl-2,4-diisocyanate
Ethylene diisocyanate
1,4-tetramethylene diisocyanate
p-Phenylene diisocyanate
Hexamethylene diisocyanate
3,3'-dimethyl-4,4'-biphenylene diisocyanate
3,3'-dimethoxy-4,4'-biphenylene diisocyanate
Polymethylene polyphenyl isocyanate
Diphenylmethane-4,4'-diisocyanate Mixtures of two or more of these isocyanates are contemplated. Likewise, so-called prepolymers obtained by mixing and reacting one or more of these diisocyanates in excess with a polyol, which may be a polyester or other material containing a plurality of hydroxyl radicals per molecule, are contemplated. Prepolymers may be formed by mixing the polyol and the organic diisocyanate. Heat to speed up reaction is optional.

Commercial materials which contain isocyanate groups and which can be used comprise Hylene TM, which is a mixture of 80 percent of 2,4-toluene diisocyanate and 20 percent of 2,6-isomers, Hylene TM65, which is a 65/35 mixture of the same isomers, and Mondur-C, which is a prepolymer of 3 moles of toluene diisocyanate and 1 mole of hexanetriol.

The amounts of organic diisocyanate are susceptible to a variation of a relatively broad range. Usually, the organic diisocyanate will be employed in an amount at least approximately equivalent to the hydroxyl groups in the polyol component. If the latter is of high acid value, it is desirable to consider the carboxyl groups in calculating the proportion of the diisocyanate component. A range of ½ equivalent to about 2 equivalents of organic isocyanate per equivalent of polyol component in the final material is contemplated.

In forming foamed polyurethane resins, it is usually necessary to provide for the liberation of an appropriate gaseous medium in the liquid mixture before gelation has become too pronounced. Foaming may be accomplished by use of a blowing agent. It will be recognized that the conventional method of liberating gas comprises the reaction of isocyanate groups in the organic polyisocyanate component with carboxyls or with water in the reaction mixture. Such reaction liberates carbon dioxide in situ, which under appropriate conditions becomes entrapped in the reaction mixture and when the latter has become set, the resultant bubbles or cells are permanently retained in the resin structure.

Another and more recent technique for forming foam structures in polyurethane resins comprises mixing a gas producing agent, such as $CCl_3F$, in appropriate amount with the polyol component. When the isocyanate component and the polyol component are mixed together to effect interpolymerization, the gas producing agent is vaporized by the heat of reaction, thus producing the desired cellular structure. A further method of forming cellular structures in polyurethane resins comprises mechanically whipping an emulsion of the liquid interpolymerizable components under appropriate conditions. This method may also be used in the production of fire resistant foams, wherein the liquid components of the foamable mixture contain a phosphorus polyol and a phosphorus-nitrogen compound which is a solid, insoluble material.

In addition to the main components, namely, the carbon-oxygen-hydrogen polyol, the organic isocyanate, the phosphorus-containing polyol and the insoluble phosphorus-nitrogen compound, the foamable mixture may contain, but is not necessarily limited to the use of certain auxiliary agents, such as curing catalysts. The latter comprise tertiary amines as represented by the following:

Tetramethyl guanadine

Tetramethyl-1,3-butanediamine (TMBDA)

Triethylene diamine (DABCO) =

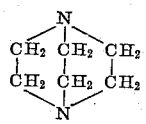

Dimethylethanolamine (DMEA)

Tin esters, such as:

Stannous oleate

Stannous octoate

Dibutyl tindilaurate and other catalysts such as are employed in forming polyurethane foams. These are but illustrative. Those catalysts conventionally employed in forming polyurethane resins may be used in the preparation of the fire retardant polyurethane foams of this invention.

The amount of catalyst may vary in a range of about 0.1 to about 5 percent by weight based upon the reactive components in the foamable mixture.

Another auxiliary agent which is useful in preparing flame resistant foams of low density comprises surfactants designed to assist in the maintenance of the cell structure of the foam while it is still soft and uncured. Many of these are disclosed in a publication entitled "Synthetic Detergents and Emulsifiers," by John W. McCutcheon, published serially in July, August, September and October 1955, in Soap and Chemical Specialties, and subsequently embodied in a reprint. This material was brought up to date in 1958. Most of the emulsifiers which have been used in the formulation of the resins are of the non-ionic type.

Examples of surfactants which may be used include the so-called Pluronics which have been described as being condensates of ethylene oxide with a hydrophobic base formed by condensing propylene oxide with propylene glycol. These are of a molecular weight in a range of about 2000 to about 8000 and are ascribed the formula $HO(C_2H_4O)_a(C_3H_6O)_b(C_2H_4O)_cH$. Members of this family as designated as:

| | |
|---|---|
| L-61 | P-75 |
| L-44 | F-68 |
| L-62 | P-84 |
| L-64 | |

Another class of surfactants comprises the so-called Tetronics, which are formed by the addition of propylene oxide to ethylene diamine, followed by the addition of ethylene oxide. These compounds have been ascribed the formula:

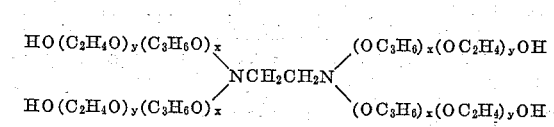

Another valuable class of surfactants comprises the so-called Tweens, which are described as the monoesters of higher fatty acids, represented by lauric acid, stearic acid and oleic acid, and polyoxyethylene sorbitan. Members of the series are represented by:

| | |
|---|---|
| Tween 20 | Tween 65 |
| Tween 21 | Tween 80 |
| Tween 40 | Tween 81 |
| Tween 60 | Tween 85 |
| Tween 61 | |

Another of the more satisfactory surfactants which has been found very effectively to maintain the cell structure in the foaming and curing of fire resistant polyurethane resins comprises derivatives of the silicones. One such product is approximately of the formula:

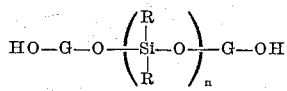

wherein G is the alkylene radical of a lower glycol, such as ethylene, propylene or butylene, and groups R are alkyl or hydroxy-substituted alkyl containing from 1 to about 4 carbon atoms, and $n$ is a number from 1 to about 20. It is a liquid product having a viscosity of 550 centipoises, refractive index of 1.4435, and a specific gravity at 25° F. of 1.02. One such material is sold as Dow-Corning 199. Still another highly useful silicon base surfactant comprises the so-called X-521 which has the structural formula

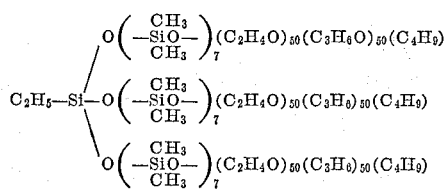

Other surfactants, especially the liquid or soluble nonionic members of the family, are useful. The surfactants may be employed in amounts within a range of about 0.1 to about 3 percent by weight based upon the mixture of polyol component and the organic isocyanate component. In relatively dense foams, for example, those weighing about 5 or 6 pounds and upward per cubic foot, the surfactants may be omitted entirely.

EXAMPLE 1

*(Control With Phosphorus-Containing Polyol No Solid Additive)*

This example is designed to show the effects of the use of a phosphorus-containing polyol without any nitrogen-phosphoramide material therein. In the formulation of the foam, two packages were made up, the first package comprising the polyols, the diisocyanates and a liquid, volatile gassing agent; and the second package comprising a catalyst and a surfactant dispersed in an appropriate amount of polyol. This package may also be termed a "master batch."

In forming the first package, two solutions were prepared, which may be termed "prepolymers." The first prepolymer was a mixture of 27 percent by weight of Victor polyol additive #6, already described, and 73 percent by weight of toluene diisocyanate. The second solution, which may also be termed a "prepolymer," comprised 78 percent by weight of toluene diisocyanate and 22 percent by weight of a polyether polyol from sucrose, comprising 11 moles of propylene oxide and 4 moles of ethylene oxide per mole of sucrose. This polyol may be designated by the formulation S11PO4EO, wherein S designates sucrose, PO designates propylene oxide, and EO designates ethylene oxide. The numbers designate moles of the compound designated by the initial letters; the number 1 before S is understood. For purposes of brevity, this system is used in characterizing the polyether polyols disclosed in subsequent examples.

These prepolymers were mixed and cooled to 50° F. and a volatile, liquid gassing agent, namely, CCl$_3$F, was added. The total composition of the first package comprised:

| | Parts by weight |
|---|---|
| First prepolymer | 67 |
| Second prepolymer | 33 |
| CCl$_3$F | 30 |

This package, so long as it was maintained at about 50° F. or below, was stable.

The second package of the foamable mixture was made up to comprise a polyol as a liquid medium and reactant, a surfactant, and a curing catalyst. The proportions of the several ingredients of the package were as follows:

| | Parts by weight |
|---|---|
| Sucrose polyol (S11PO4EO) | 85 |
| TMBDA[1] (catalyst) | 0.7 |
| Surfactant (X-521) | 1 |

[1] TMBA=N,N,N',N'-tetramethyl-1,3-butanediamine.

One hundred thirty grams of the first package were added to the second package and the two were mixed together by means of a dowel for about 20 to 30 seconds. The mixture contained 1 percent by weight of phosphorus from the phosphorus-containing polyol.

The mixture foamed and set within 140 to 145 seconds total time. The foam was cured in an oven at a temperature of 150° F. for a period of 1 hour to provide a product having the following characteristics:

| | |
|---|---|
| Density | 1.99 pounds per cubic foot. |
| Closed cells | 84.6 percent. |
| Heat resistance at 200° F. for 72 hours | 6 percent (in linear expansion). |
| Burn test (ASTM-1692-59T) | The entire sample burned at a rate of 3 to 4 inches per minute. |

The foam was not fire resistant. This example constitutes a control with which foams containing a phosphorus polyol and a nitrogen-phosphorus compound prepared in accordance with the provisions of this invention may be compared.

EXAMPLE 2

*Control Pulverulent Solids—No Phosphorus-Containing Polyol*

This example also constitutes a control showing the use of a pulverulent, water-insoluble phosphorus-nitrogen-carbon compound, but without the phosphorus-containing polyol component of the complete combination involved in the present invention.

In this example, the polyol component comprised a product of 1 mole of sucrose and 12 moles of propylene oxide (S12PO) reacted together in the manner described. In formulating the foam, two packages were made up as in Example 1. The first package comprised a prepolymer of 78 parts by weight of toluene diisocyanate (80–20 mixed isomers) and 22 parts by weight of the sucrose polyol. These components were heated together for 2½ hours at a temperature ranging from 40° C. up to 80° C. The prepolymer was cooled to 50° F. and a gas producing agent (CCl$_3$F) was added to provide a first package of a foamable mixture.

The first package of the foamable mixture comprised:

| | Parts by weight |
|---|---|
| Prepolymer (as above described) | 100 |
| Liquid gas producing agent (CCl$_3$F) | 30 |

These components were mixed and maintained at 50° F. or below the boiling point of the CCl₃F (74.5° F.).

The essential data of these tests, including a repetition of that of Example 2, are tabulated as follows:

*Table of Examples 2 and 2A*

FOAMS CONTAINING NITROGEN-PHOSPHORUS SOLID ADDITIVES AS ONLY FIRE RETARDANTS

| Sucrose polyol composition | | | Catalyst [1] | Set time | Density, lb./cu. ft. | Burn test | Nitrogen-phosphorus compound |
| --- | --- | --- | --- | --- | --- | --- | --- |
| Sucrose | Propylene oxide | Ethylene oxide | | | | | |
| 1 | 12 | 0 | DABCO, 1.0 | 115–120 | 1.77 | Burned up 6.5 in./min. | 5 parts melamine-P₂O₅ product. |
| 1 | 11 | 4 | TMBDA, 0.7 | 125–130 | 1.99 | Burned up 5.2 in./min. | 15 parts urea-P₂O₅ product. |
| 1 | 11 | 4 | TMBDA, 0.7 | 130–145 | 1.86 | Burned up 9.6 in./min. | 5 parts NH₃-POCl₃ product. |
| 1 | 11 | 4 | TMBDA, 0.7 | 115–120 | 2.07 | Burned up 7.7 in./min. | 5 parts urea-P₂O₅ product. |
| 1 | 11 | 4 | TMBDA, 0.7 | 135–140 | 1.90 | Burned up 5.2 in./min. | 15 parts NH₃-POCl₃ product. |

[1] Parts by weight.

The second package, or master batch of this foamable mixture comprised:

Parts by weight
Sucrose-propylene oxide polyol (as above described) _____ 73.5
Surfactant (X–521) _____ 1
Catalyst (DABCO)[1] _____ 1
Nitrogen-phosphorus compound (melamine+P₂O₅) 5

[1] Diazabicyclo(2,2,2)octane, also known as triethylene diamine and being of the formula:

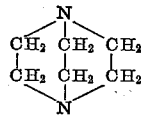

The two packages were mixed together for 25 seconds and were then allowed to foam and set. Setting occurred in a total time of 115 to 120 seconds. The resultant foam was cured in an oven at a temperature of 150° F. for a period of 1 hour. The resultant foam was friable. Its other characteristics were:

Density _____ 1.77 pounds per cubic foot.
Closed cells _____ 87.4 percent.
Burn test _____ The entire sample, 6 inches in length, burned at a rate of 6.5 inches per minute.

The product was of poor fire resistance.

EXAMPLE 2A

The foregoing tests were repeated in a series of controls, with different sucrose-alkylene oxide polyol derivatives, with different catalysts and with different nitrogen-phosphorus polyamide solid materials.

In the tests indicated, 22 parts by weight of each sucrose polyol were combined with 78 parts by weight of toluene diisocyanate mixed isomers to provide a prepolymer. The gassing agent (30 parts by weight of CCl₃F) was added to 100 parts by weight of the prepolymer at 50° F., thus providing the first package of the foam. The second package was made up of:

Parts by weight
Polyol _____ About 85
Surfactant (X–521) _____ 1
Catalyst _____ 1

The two packages were mixed, foamed and cured as in Example 2.

It will be observed that all of these foams were poor in fire resistance. The pulverulent phosphorus-nitrogen compounds by themselves did not increase flame resistance much even when used in an amount of 15 parts by weight.

In the following examples, the combination of the phosphorus-containing polyol and a pulverulent nitrogen-phosphorus compound were, in most instances, employed in the preparation of foams having enhanced flame retardant properties as compared with materials containing either one of the components taken singly.

The essential data of the various combinations of phosphorus-containing polyols and nonfunctional phosphoryl polyamides in a series of Examples 3–11, and being designed to show the synergistic effect upon flame retardancy of the combinations of the two ingredients, are now presented in tabular form. In forming the foamable mixtures, the packages A and B were agitated together for a few seconds, e.g., about 25 to 35 seconds. The mixtures were allowed to foam and set, which usually occurred in about 76 to 260 seconds. The mixtures were cured for 1 hour at 150° F. The properties of the foamed product were then determined. The properties thereof are presented in the Table of Examples 3–11.

In the examples, diisocyanate, e.g., toluene diisocyanate 80/20 mixed isomers, was reacted with a polyol component to provide a so-called prepolymer which was, itself, a liquid polyurethane resin containing available isocyanate groups adapted to react with additional polyol when the packages required for the complete foamable mixture were combined. In some instances, the toluene diisocyanate was reacted with the phosphorus-containing polyol, in which instance it has been designated as "Prepolymer 1." In other instances, the diisocyanate was initially reacted with sucrose polyether polyol, in which instance the prepolymer has been designated as "Prepolymer 2." In some instances, both Prepolymer 1 and Prepolymer 2 occurred as a mixture in the same package.

In the following data table for the examples, the manner of introducing the diisocyanate (as Prepolymer 1 or Prepolymer 2) is indicated under the section headed "Prepolymers."

Owing to limitations as to space, explanations as to the actual compositions of the polyols employed in the examples in forming the prepolymers, or subsequently mixed with the prepolymer, are incorporated in a second table designated "Explanation of Table of Examples 3–11." The compositions of the phosphoryl polyamide additives are also included in this second table.

In the data table, the numbers given in the sections headed "Prepolymers," "First Package (A) in Foam" and "Second Package (B) in Foam," are parts by weight.

Data Table of Examples 3–11
COMBINATIONS OF PHOSPHORUS-CONTAINING POLYOLS AND PHOSPHORYL POLYAMIDES

| Example No. | 3 | 4 | 5 | 6 | 7A | 7B | 8A | B | 9A | 9B | 9C | 10 | 11A | 11B |
|---|---|---|---|---|---|---|---|---|---|---|---|---|---|---|
| Prepolymers: | | | | | | | | | | | | | | |
| Phosphoryl polyol in prepolymer 1ª | 27 | 27 | 24 | 0 | ¹22 | ¹22 | | | 20 | 20 | 20 | 20 | 20 | 20 |
| Trimethylolethane in prepolymer 1 | | | | | | | | | 6 | 6 | 6 | 6 | 6 | 6 |
| Toluene diisocyanate in prepolymer 1 | 73 | 73 | 76 | 0 | 78 | 78 | | | 74 | 74 | 74 | 74 | 74 | 74 |
| Sucrose polyol prepolymer 2ᵇ | 20 | 20 | 17 | 22 | | | 22 | 22 | 0 | 0 | 0 | 0 | 0 | 0 |
| TDI in prepolymer 2 | 80 | 80 | 78 | 78 | | | 78 | 78 | 0 | 0 | 0 | 0 | 0 | 0 |
| Trimethylolethane in prepolymer 2 | | | 5 | | | | | | 0 | 0 | 0 | 0 | 0 | 0 |
| First package (A) in foam: | | | | | | | | | | | | | | |
| Prepolymer 1 | 67 | 67 | 26 | 0 | 100 | 100 | | | 100 | 100 | 100 | 100 | 100 | 100 |
| Prepolymer 2 | 33 | 33 | 67 | 100 | 0 | 0 | 100 | 100 | 0 | 0 | 0 | 0 | 0 | 0 |
| Gassing agent (CCl₃F) | 30 | 30 | 28 | 30 | 30 | 30 | 30 | 30 | 30 | 30 | 30 | 30 | 30 | 30 |
| Second package (B) in foam: | | | | | | | | | | | | | | |
| Sucrose polyol ᵇ | 73 | 73 | 70 | 68 | 79 | 79 | 67 | 67 | 65 | 65 | 65 | 74 | 65 | 65 |
| Second package phosphoryl polyol ª | | | | 18 | 4 | 4 | 26 | 26 | 0 | 0 | 0 | 0 | 0 | 0 |
| Second package phosphoryl polyamide ᶜ | 5 | 5 | 5 | 5 | 0 | 5 | 0 | 5 | 0 | 5 | 10 | 3 | 5 | 10 |
| Surfactant | 1 | 1 | 1 | 1 | 1 | 1 | 1 | 1 | 1 | 1 | 1 | 1 | 1 | 1 |
| Catalyst | ²0.5 | ²0.5 | ²0.7 | ³1 | ⁴0.5 | ⁴0.5 | ⁵0.5 | ⁵0.5 | ³1 | ³1 | ³1 | ⁴0.6 | ³1 | ³1 |
| Properties of foam: | | | | | | | | | | | | | | |
| Density (lbs./cu. ft) | 1.90 | 1.86 | 1.90 | 1.73 | 1.86 | 1.86 | 2.0 | 2.05 | 1.90 | 1.69 | 1.82 | 1.86 | 2.03 | 2.03 |
| Percent closed cells | 87.9 | 87.5 | 84.6 | 91.6 | | | 80.7 | 76.9 | 84.8 | 85.1 | 89.3 | 86.2 | 88.4 | 89 |
| Burned (seconds) | 26 | 31 | 26.3 | 30 | 56 | 28 | 115 | 46 | 117 | 47 | 38 | 31 | 81 | 44 |
| Burned (inches) | ¾ | 1¼ | 1⅜ | 1 1/16 | 2¼ | 1 5/16 | Total | 2½ | 4½ | 2¼ | 1 5/16 | 1 5/16 | 3¾ | 1⅞ |

¹ The phosphorus polyol of Examples 7A and 7B of the table of Examples 3–11 comprises 3.7 moles of phosphoric acid, 1.2 moles of phosphorus pentoxide and 3.95 moles of ethylene glycol. The ester product of this mixture was then further reacted with 5.4 moles of propylene oxide to provide an ester product having a hydroxyl value of 364 and an acid value approaching 0. The phosphorus content of this product was 9.8 percent.  ² DMEA.  ³ DABCO.  ⁴ TMBDA.  ⁵ SnOct.

NOTE.—Explanation of table of Examples 3–11:

| Example No. | ª Phosphoryl polyol | ᵇ Sucrose polyol | | | ᶜ Phosphoryl polyamide |
|---|---|---|---|---|---|
| | | Sucrose | Propylene oxide | Ethylene oxide | |
| 3 | Victor additive #6 | 1 | 3 | 12 | Urea 5 moles+P₂O₅ 1 mole. |
| 4 | ---do--- | 1 | 3 | 12 | Melamine polyamide (Example D). |
| 5 | ---do--- | 1 | 3 | 12 | NH₃+POCl₃ (Example A). |
| 6 | ---do--- | 1 | 12 | 4 | NH₃+POCl₃ (Example A). |
| 7 | H₃PO₄+ethylene glycol+propylene oxide (Example J). | 1 | 3 | 12 | NH₃+POCl₃ (Example A). |
| 8 | Example E | 1 | 11 | 4 | NH₃+POCl₃ (Example A). |
| 9 | Vircol 82 | 1 | 12 | 2 | Urea 5 moles +P₂O₅ 1 mole. |
| 10 | ---do--- | 1 | 11 | 4 | Victamide*. |
| 11 | ---do--- | 1 | 11 | 4 | Urea 5 moles+P₂O₅ 1 mole. |

* Victamide is a water-soluble, ammonium salt of an amidopolyphosphate comprising 22.4 parts by weight of NH₃ and 76.1 parts by weight of P₂O₅. Amide nitrogen is 4 percent by weight; total nitrogen is 18.4 percent by weight; phosphorus is 16.6 percent by weight. The pH value is about 4.8. The empirical formula is approximately N₅H₁₁+P₂O₇. The structure may vary to some extent, but the average molecule may be represented approximately as follows:

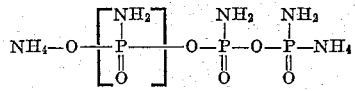

n being a number between 0 and 6. It seems that in some instances, the —O— linkage is replaced at least in part by -N-groups.
              H

EXAMPLE 12

In accordance with the provisions of this example, the prepolymer comprised:

| | Parts by weight |
|---|---|
| Vircol 82 | 20 |
| Trimethylolethane | 6 |
| Toluene diisocyanate (80–20 mixture) | 74 |

This prepolymer was cooled in the manner previously described and 30 parts by weight of CCl₃F were added. In the example, two such packages of the above prepolymer components of the foam were made up.

Two second mixtures, termed "master batches," were then made up, each comprising:

| | Parts by weight |
|---|---|
| Sucrose polyether polyol (S11PO4EO) | 76.2 |
| Surfactant (X–521) | 0.9 |
| Catalyst (TMBDA) | 0.6 |
| | 77.7 |

To one of the master batches were added 5 parts by weight of a phosphorus-containing polyamide from urea and phosphorus pentoxide, while to the second were added 5 parts by weight of a phosphorus-containing polyamide obtained by reacting ammonia and phosphorus oxychloride. The resultant second packages were incorporated with the first packages, already described, to provide foamable mixtures, and these mixtures were foamed, set and cured following the schedules described in the other examples herein. The properties of the resultant foams are:

| | Sample 1 | Sample 2 |
|---|---|---|
| Set time (seconds) | 210–215 | 210–215 |
| Density (lbs./cu. ft.) | 1.65 | 1.98 |
| Percent closed cells | 94.1 | 94.1 |
| Burn test time (seconds) | 32 | 40 |
| Length burned (inches) | 1½ | 1½ |

EXAMPLE 13

It will be recognized that polyurethane foam resins have also been prepared in which a polyester of a polyhydric alcohol and a dicarboxylic acid is reacted with a polyisocyanate to obtain urethane linkages. The combination of a phosphorus-containing polyol and a nitrogen-phosphorus solid additive may also be used as a fire retardant agent in this type of foam. The fire retardant agents are seldom required in the flexible foams, but are useful in the more rigid types such as are often used as thermal insulation in buildings, refrigerators, and other structures. The following is illustrative of the preparation of a polyester having high hydroxyl content and being adapted for use in preparing rigid polyurethane resin foams. The components of the polyester are:

| | | |
|---|---|---|
| Adipic acid | moles | 5.0 |
| Phthalic anhydride | do | 1.0 |
| Ethylene glycol | do | 1.1 |
| Propylene glycol | do | 1.2 |
| Trimethylolethane | do | 5.2 |
| Glycerol | do | 4.2 |
| Stannous chloride | percent | 0.01 |

This mixture was cooked in the usual manner to an acid value less than 2 and to a hydroxyl number of about 575 and a viscosity of about 32,000 cps. at 77° F.

In order to prepare a foamed resin of improved resistance to flame from this polyester, a prepolymer was prepared comprising the foregoing polyester and the commercial phosphorus-containing polyol sold as Vircol 82 as the polyol component. The components of the prepolymer were as follows:

| | Parts by weight |
|---|---|
| Vircol 82 | 17 |
| Polyester (as above described) | 7 |
| Trimethylolethane (added polyol) | 2 |
| Toluene diisocyanate | 74 |
| PCl$_3$ | 0.01 |

This mixture was adapted to react to provide a polyurethane resin. In order to cellulate the same, a blowing agent, such as CCl$_3$F, was incorporated. In order to demonstrate the synergistic effects of a phosphorus-containing polyol and a phosphorus-nitrogen polyamide solid additive in improving the flame resistance of a foam prepared from the forgoing prepolymer, two samples were prepared, one containing only the phosphorus-containing polyol as a flame retardant agent and the other containing a solid polyamide resulting from the reaction of phosphorus trichloride and ammonia prepared in the manner already described. The foamable mixtures were as follows:

| | Sample 1 | Sample 2 |
|---|---|---|
| Prepolymer | 100 | 100 |
| CCl$_3$F | 30 | 30 |
| Polyester | 61.5 | 61.5 |
| X-521 (surfactant) | 0.5 | 0.5 |
| DMEA (catalyst) | 0.8 | 0.8 |
| POCl$_3$+NH$_3$ | | 5.0 |

The mixtures were foamed, set and cured and tested in the manner already described. The properties of the foams obtained are tabulated as follows:

| | Sample 1 | Sample 2 |
|---|---|---|
| Set time (seconds) | 95–100 | 155–160 |
| Density (lbs./cu. ft.) | 1.80 | 1.80 |
| Burn time (seconds) | 35 | 26 |
| Length burned (inches) | 1 | ⅝ |

From these tests it is evident that the foam containing the solid additive is substantially more flame resistant than the corresponding sample from which the solid phosphorus-nitrogen additive is omitted. It was considered that the foam from Sample 2 would be superior for many purposes to that from Sample 1.

EXAMPLE 14

This example is illustrative of the preparation of a foam having fire retardant properties in a single stage ("one shot") operation (without the preparation of a prepolymer). In the preparation of the foam, a mixture of the following ingredients was prepared:

| | Parts by weight |
|---|---|
| Sucrose polyether polyol (S11PO4EO) | 82 |
| Phosphorus-containing polyol (Victor #6) | 18 |
| Surfactant (X-521) | 1 |
| Phosphorus polyamide (POCl$_3$+NH$_3$) | 5 |
| Catalyst (TMBDA) | 0.5 |
| Gassing agent (CCl$_3$F) | 28 |

The foregoing ingredients were mixed together and to the mixture were added 70 parts by weight of toluene diisocyanate (80–20 mixed isomers). The mixture foamed and was cured in accordance with the preceding schedule (1 hour at 150° F.). A foamed body which was about 65 percent closed cell structure was obtained. In a flame test (ASTM 1692) the sample burned for 35 seconds and extinguished itself. About 1 1/16 inches were burned.

This system may be followed in the other examples without the necessity of forming a prepolymer. However, the prepolymer technique is presently preferred.

In the preceding examples, the use of solid, pulverulent phosphorus polyamides in order synergistically to enhance the flame retardancy of polyurethane resin foams has been emphasized. It is also found that certain of the liquid phosphorus-containing polyamides may also be used in a like capacity, as illustrated by the following examples.

EXAMPLE 15

In this example, hexamethyl phosphoramide (a liquid) was employed as the phosphorus-containing polyamide. To illustrate the use thereof, a series of three tests were conducted in which the first packages were comprised of a prepolymer containing 22 parts by weight of sucrose polyol, containing 11 moles of propylene oxide and 4 moles of ethylene oxide per mole of sucrose, and 78 parts by weight of toluene diisocyanate (80–20 mixed isomers). This prepolymer was cooled to 50° F. and 30 parts by weight of CCl$_3$F were added.

The second packages were respectively of the compositions:

| | Parts by weight | | |
|---|---|---|---|
| | Test 1 | Test 2 | Test 3 |
| Sucrose polyol (same as above) | 68 | 68 | 68 |
| Phosphorus-containing polyol (Victor #6) | 18 | 0 | 20 |
| Hexamethyl phosphoramide | 5 | 9.9 | 0 |
| Surfactant (X-521) | 1 | 1 | 1 |
| Catalyst (DABCO) | 0.5 | 0.5 | 0.5 |

The foams were cured 1 hour at 150° F.

Tests 2 and 3 constituted controls illustrating the use of a single fire retardant. Test 1 illustrated the use of a combination of the two fire retardants. The properties of the foams were as follows:

| | Test 1 | Test 2 | Test 3 |
|---|---|---|---|
| Density (lbs./cu. ft.) | 1.96 | 1.68 | 1.90 |
| Closed cells (percent) | 74.9 | 90.0 | 91.1 |
| Burn test (seconds) | 38.0 | 150.0 | 50.0 |
| Length burned (inches) | 1½ | 6 | 1¾ |

We claim:
1. A flame retardant polyurethane resin which is formed from a mixture comprising:
(A) an organic polyisocyanate;

(B) a polyol consisting essentially of carbon, hydrogen and oxygen, the reactive groups of said polyol being hydroxyl groups;
(C) a polyol which is a hydroxyalkyl ester of an oxyacid of pentavalent phosphorus;
(D) a polyamide of an oxyacid of phosphorus, said polyamide containing nitrogen and phosphorus present in the group

and being at least 10 percent by weight of amido nitrogen and at least 10 percent by weight of pentavalent phosphorus combined in said polyamide.

2. A flame retardant cellular polyurethane resin which is formed from a mixture comprising:
(A) an organic polyisocyanate;
(B) a polyol consisting essentially of carbon, hydrogen and oxygen, the reactive groups of said polyol being hydroxyl groups;
(C) a polyol which is a hydroxyalkyl ester of an oxyacid of pentavalent phosphorus;
(D) a polyamide of an oxyacid of phosphorus, said polyamide containing nitrogen and phosphorus present in the group

and being at least 10 percent by weight of amido nitrogen and at least 10 percent by weight of pentavalent phosphorus combined in said polyamide;
(E) a blowing agent for polyurethane resins.

3. The cellular polyurethane resin of claim 2 wherein the blowing agent is a fluorochlorocarbon.

4. A flame retardant cellular polyurethane resin which is formed from a mixture comprising:
(A) a prepolymer of an organic polyisocyanate and a polyether polyol consisting essentially of atoms of carbon, hydrogen and oxygen, the reactive groups of said polyol being hydroxyl groups, said prepolymer containing unreacted isocyanato groups;
(B) added polyols, one of which is the polyol of paragraph (A) and another of which is
(C) a hydroxyalkyl ester of an oxyacid of pentavalent phosphorus;
(D) a polyamide of an oxyacid of phosphorus, said polyamide containing nitrogen and phosphorus present in the group

and being at least 10 percent by weight of amido nitrogen and at least 10 percent by weight of pentavalent phosphorus combined in said polyamide;
(E) a blowing agent for polyurethane resins.

5. The cellular polyurethane resin of claim 4 wherein the blowing agent is a fluorochlorocarbon.

6. A flame retardant cellular polyurethane resin which is formed from a mixture comprising:
(A) an orangic polyisocyanate;
(B) a polyol consisting essentially of carbon, hydrogen and oxygen, the reactive groups of said polyol being hydroxyl groups;
(C) a polyol of the structure

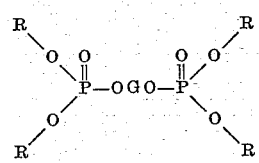

wherein each R represents an alkylene group terminated by a hydroxyl group, and G is a hydrocarbon group containing up to 6 carbon atoms;
(D) a polyamide of an oxyacid of pentavalent phosphorus containing nitrogen and phosphorus present in the group

and being at least 10 percent by weight of amido nitrogen and at least 10 percent by weight of pentavalent phosphorus combined in said polyamide;
(E) a blowing agent for polyurethane resins.

7. A flame retardant cellular polyurethane resin which is formed from a mixture comprising:
(A) an aromatic polyisocyanate;
(B) a polyol which is the oxyalkylation product of sucrose and a lower alkylene oxide, the reactive groups of said polyol being alcoholic hydroxyl groups;
(C) a polyol formed by the reaction of diethanol amine, diethyl phosphite and acetaldehyde;
(D) a pulverulent polyamide prepared by the reaction of phosphorus oxychloride and ammonia, said polyamide containing nitrogen and phosphorus in the group

and being at least 10 percent by weight of amido nitrogen and at least 10 percent by weight of pentavalent phosphorus combined in said polyamide.

8. A method of preparing a flame retardant polyurethane resin which comprises forming a mixture of:
(A) an organic polyisocyanate;
(B) a polyol consisting essentially of carbon, hydrogen and oxygen, the reactive groups of said polyol being hydroxyl groups;
(C) a polyol which is a hydroxyalkyl ester of an oxyacid of pentavalent phosphorus;
(D) a polyamide of an oxyacid of phosphorus, said polyamide containing nitrogen and phosphorus present in the group

and being at least 10 percent by weight of amido nitrogen and at least 10 percent by weight of pentavalent phosphorus combined in said polyamide; and curing the resulting mixture.

9. A method of preparing a flame retardant cellular polyurethane resin which comprises forming a mixture of:
(A) an organic polyisocyanate;
(B) a polyol consisting essentially of carbon, hydrogen and oxygen, the reactive groups of said polyol being hydroxyl groups;
(C) a polyol which is a hydroxyalkyl ester of an oxyacid of pentavalent phosphorus;
(D) a polyamide of an oxyacid of pentavalent phosphorus containing nitrogen and phosphorus present in the group

and being at least 10 percent by weight of amido nitrogen and at least 10 percent by weight of pentavalent phosphorus combined in said polyamide;
(E) a blowing agent for polyurethane resins; and foaming and curing the resulting mixture.

10. A method of preparing a flame retardant cellular polyurethane resin which comprises forming a mixture of:
(A) a prepolymer of an organic polyisocyanate and a polyol consisting essentially of atoms of carbon, hydrogen and oxygen, the reactive groups of said polyol being hydroxyl groups, said prepolymer containing unreacted isocyanato groups;
(B) added polyols, one of which is the polyol of paragraph (A), and another of which is
(C) a hydroxyalkyl ester of an oxyacid of pentavalent phosphorus;

(D) a polyamide of an oxyacid of pentavalent phosphorus containing nitrogen and phosphorus present in the group

and being at least 10 percent by weight of amido nitrogen and at least 10 percent by weight of pentavalent phosphorus combined in said polyamide;
(E) a blowing agent for polyurethane resins; and foaming and curing the resulting mixture to a cellular product.

11. The method of claim 10 wherein the blowing agent is a fluorochlorocarbon.

12. A method of preparing a cellular polyurethane resin having fire retardant properties to the extent that it will extinguish itself when ignited, which comprises forming a mixture of:
(A) a prepolymer of an organic polyisocyanate and a polyol consisting essentially of atoms of carbon, hydrogen and oxygen, the reactive groups of said polyol being hydroxyl groups, said prepolymer containing unreacted isocyanato groups;
(B) added polyols, one of which is the polyol of paragraph (A), and another of which is
(C) a polyol of the structure

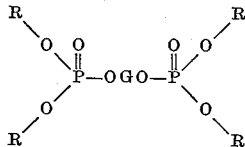

wherein each R is an alkylene group having a terminal hydroxy group, and G is a hydrocarbon group containing up to 6 carbon atoms;
(D) a pulverulent polyamide of an oxyacid of phosphorus containing nitrogen and phosphorus present in the group

and being at least 10 percent by weight of amido nitrogen and at least 10 percent by weight of pentavalent phosphorus combined in said polyamide;
(E) a blowing agent for polyurethane resins; and foaming and curing the mixture to a cellular product.

13. A method of preparing a flame retardant cellular polyurethane resin which comprises forming a mixture of:
(A) an aromatic polyisocyanate;
(B) a polyol which is the oxyalkylation product of sucrose and a lower alkylene oxide, the reactive groups of said polyol being hydroxyl groups;
(C) a polyol formed by the reaction of diethanol amine, diethyl phosphite and acetaldehyde;
(D) a pulverulent polyamide which is the reaction product of phosphorus trioxychloride and ammonia, said polyamide containing nitrogen and phosphorus present in the group

and being at least 10 percent by weight of amido nitrogen and at least 10 percent by weight of pentavalent phosphorus combined therein;
(E) a fluorochlorocarbon blowing agent; and foaming and curing the resulting mixture to a cellular product.

References Cited in the file of this patent

UNITED STATES PATENTS

| | | |
|---|---|---|
| 2,600,455 | Wilson et al. | June 17, 1952 |
| 2,632,767 | Smith et al. | Mar. 24, 1953 |
| 2,831,838 | Fekete | Apr. 22, 1958 |
| 2,835,652 | Haven | May 20, 1958 |
| 2,907,718 | Greenlee | Oct. 6, 1959 |
| 2,909,559 | Lanham | Oct. 20, 1959 |
| 2,963,451 | Coates | Dec. 6, 1960 |
| 2,974,159 | Koral | Mar. 7, 1961 |